(12) United States Patent
Ajisaka

(10) Patent No.: US 8,672,067 B2
(45) Date of Patent: Mar. 18, 2014

(54) VEHICLE FRONT PORTION STRUCTURE

(75) Inventor: Satoshi Ajisaka, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/145,975

(22) PCT Filed: Feb. 24, 2009

(86) PCT No.: PCT/JP2009/053281
§ 371 (c)(1),
(2), (4) Date: Jul. 22, 2011

(87) PCT Pub. No.: WO2010/097890
PCT Pub. Date: Sep. 2, 2010

(65) Prior Publication Data
US 2011/0284298 A1 Nov. 24, 2011

(51) Int. Cl.
*B60K 11/00* (2006.01)
(52) U.S. Cl.
USPC ..... 180/65.21; 180/68.2; 180/68.1; 180/68.6; 180/68.3; 180/69.22; 180/68.4; 180/69.21; 180/69.24; 903/904; 165/41; 165/98
(58) Field of Classification Search
USPC ........................................................ 180/68.2
See application file for complete search history.

(56) References Cited

U.S. PATENT DOCUMENTS

| 2,247,742 A | 7/1941 | Best |
| 2,913,065 A | 11/1959 | Lyon, Jr. |
| 5,526,872 A | 6/1996 | Gielda et al. |
| 6,341,814 B1 | 1/2002 | Honninger et al. |
| 6,854,544 B2 | 2/2005 | Vide |
| 2003/0121638 A1* | 7/2003 | Molari et al. ............ 165/41 |
| 2003/0201133 A1 | 10/2003 | Kobayashi et al. |
| 2008/0000615 A1 | 1/2008 | Hiroshima et al. |
| 2011/0284298 A1 | 11/2011 | Ajisaka |
| 2012/0024611 A1 | 2/2012 | Ajisaka |

FOREIGN PATENT DOCUMENTS

| DE | 3150152 A1 | 6/1983 |
| EP | 0391391 A1 | 10/1990 |
| EP | 1495896 A2 * | 1/2005 |
| GB | 711 909 A | 7/1954 |
| GB | 2 120 379 A | 11/1983 |
| JP | 47-968 Y1 | 1/1972 |
| JP | 59-9119 U | 1/1984 |
| JP | 61-146635 A | 7/1986 |

(Continued)

OTHER PUBLICATIONS

International Search Report issued May 26, 2009 & Written Opinion of PCT/JP2009/053281.

(Continued)

*Primary Examiner* — J. Allen Shriver, II
*Assistant Examiner* — Hilary L Johns
(74) *Attorney, Agent, or Firm* — Kenyon & Kenyon LLP

(57) ABSTRACT

A vehicle front portion structure is provided which can lengthen a wheel base without increasing the size of a vehicle body. A vehicle front portion structure is provided with a bumper reinforcement of a front bumper, a power unit that drives a front wheel arranged to a vehicle rear of the bumper reinforcement, and a cooling unit which is arranged at a vehicle front of a dash panel, and is arranged at a vehicle rear of the power unit.

7 Claims, 14 Drawing Sheets

(56) References Cited

FOREIGN PATENT DOCUMENTS

| | | | |
|---|---|---|---|
| JP | 3-47284 U | 5/1991 | |
| JP | 4-118317 A | 4/1992 | |
| JP | 05-301528 A | 11/1993 | |
| JP | 5301528 A | 11/1993 | |
| JP | 6328931 A | 11/1994 | |
| JP | 10-100939 A | 4/1998 | |
| JP | 10100939 A | * 4/1998 | |
| JP | 2002-155504 A | 5/2002 | |
| JP | 2003-211981 A | 7/2003 | |
| JP | 2003-237385 A | 8/2003 | |
| JP | 2006-327371 A | 12/2006 | |
| JP | 2006-347309 A | 12/2006 | |
| JP | 2006347309 A | * 12/2006 | |
| JP | 2007-050801 A | 3/2007 | |
| JP | 2007-050802 A | 3/2007 | |
| JP | 2007-069651 A | 3/2007 | |
| JP | 2007050802 A | * 3/2007 | |

OTHER PUBLICATIONS

Extended European Search Report of EP 99 84 0744 dated Aug. 31, 2012.
Office Action dated Nov. 7, 2012 for the related U.S. Appl. No. 13/257,759.

* cited by examiner

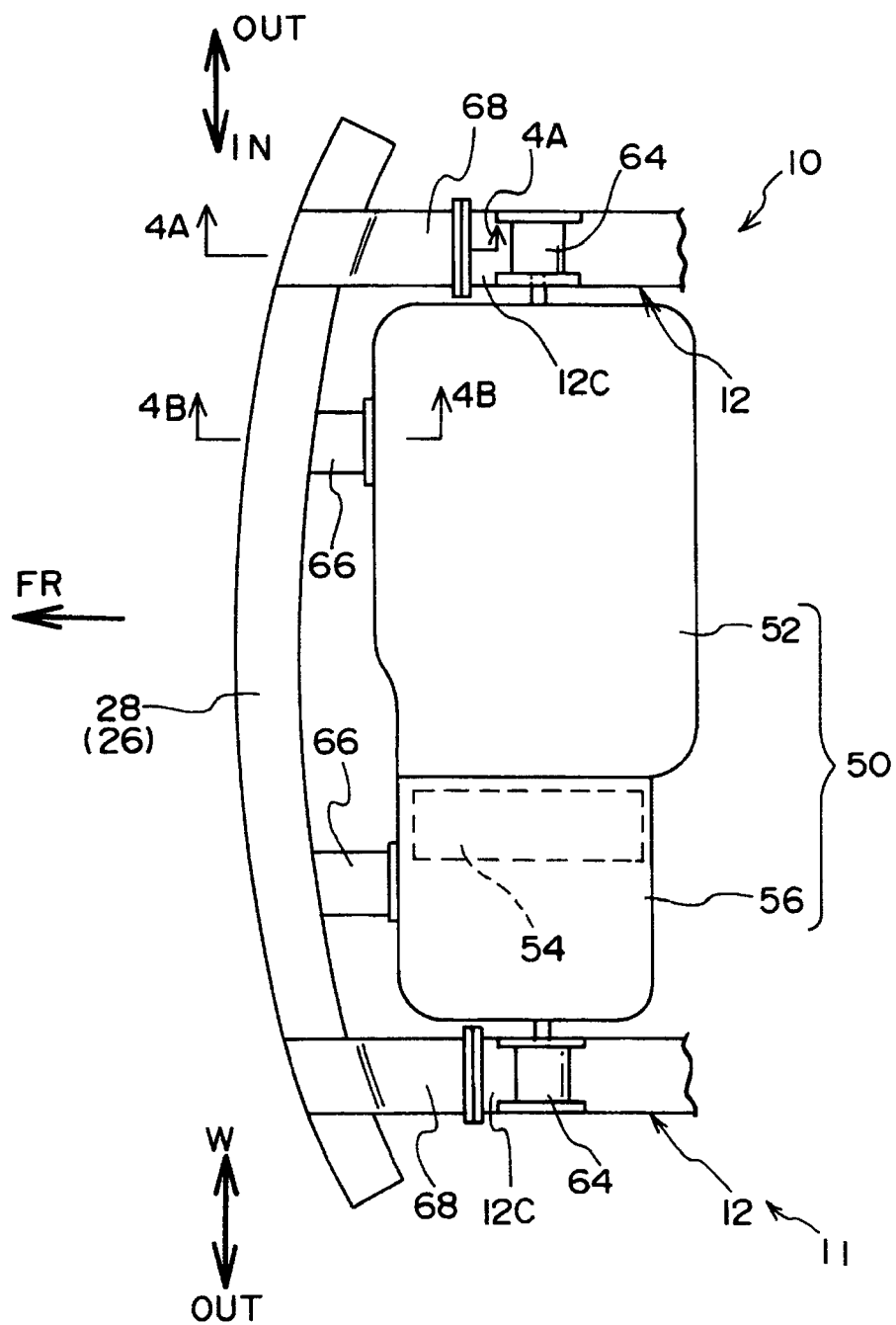

VEHICLE FRONT PORTION STRUCTURE

This is a 371 national phase application of PCT/JP2009/053281 filed 24 Feb. 2009, the contents of which are incorporated herein by reference.

TECHNICAL FIELD

The present invention relates to a vehicle front portion structure provided with a power unit.

BACKGROUND ART

A vehicle front portion structure is known in which a bumper reinforcement of a front bumper, a radiator and condenser, and an engine and transmission, which constitute a power unit, are disposed in this order from a vehicle front (see Japanese Patent Application Laid-Open (JP-A) No. 2007-69651 and JP-A No. 2006-327371).

Further, a front portion vehicle body structure is known in which a radiator is disposed between an engine and a bonnet that covers an engine room from above in a vehicle vertical direction, that is, disposed above an engine (see JP-A No. 6-328931). Moreover, a roller vehicle is known in which a radiator is disposed in an engine room disposed below a driver's seat, to the rear of the engine in a vehicle front-rear direction (see JP-A No. 2002-155504). Still further, an air-conditioning unit installation structure is known in which a cooler unit and a blower unit that constitute an air-conditioning unit are disposed in an engine room, while a heater unit is disposed in a cabin (see JP-A No. 4-118317). Further, a vehicle battery mounting structure is also known in which a battery is disposed between a dash panel and an instrument panel such that it is disposed from a driver's seat side to a passenger seat side (see JP-A No. 2007-50801).

DESCRIPTION OF THE INVENTION

Problem to be Solved by the Invention

When the weight (of the structural elements) of a vehicle body is reduced, since a power unit becomes comparatively heavy, in order to maintain an appropriate load bearing balance between the front and rear wheels, it has been necessary to employ measures such as lengthening a wheel base. As a result, the vehicle body increases in size, and the extent to which reducing the weight of the vehicle body contributes to reducing the weight of the vehicle as a whole decreases. In other words, the effect of reducing the weight of the vehicle body elements is lessened.

The present invention takes as an object to obtain a vehicle front portion structure that can allow a wheel base to be lengthened without increasing the size of a vehicle.

Means for Solving the Problem

A vehicle front portion structure according to a first aspect of the present invention is a vehicle front portion structure comprising: a framework member of a front bumper; a power unit provided at a rear in a vehicle front-rear direction with respect to the framework member, that drives at least a front wheel of a vehicle, and a cooling unit provided at a rear in a vehicle front-rear direction with respect to the power unit and at a vehicle front with respect to a dash panel, and comprising at least one of a heat exchanger that constitute a cooling system of the power unit and a condenser of an air conditioning device.

According to the above aspect, a framework member of a front bumper, a power unit and a cooling unit are provided in this order from a vehicle front portion, at a vehicle front with respect to a dash panel. In the above aspect, a power unit that drives a front wheel can be located near to directly behind a framework member of a front bumper. Thereby, a power unit and a front wheel can be located at a vehicle front portion, and a wheel base can be lengthened without increasing the entire length of a vehicle body towards the front and rear.

Thus, in the vehicle front portion structure according to the above aspect, a wheel base can be lengthened without increasing the size of a vehicle body. Thereby, upon lightening a vehicle body, a wheel base can be lengthened towards a vehicle front side and a favorable load balance can be obtained between the front and rear wheels, and the lightening of a vehicle body can contribute greatly to the lightening of a vehicle as a whole.

In the above aspect, a configuration may be provided in which the vehicle front portion structure further includes an air conditioning unit for air conditioning a cabin, which is provided at a vehicle front with respect to the dash panel and is modular such that it can be handled in an integrated manner with the cooling unit.

According to the above aspect, since a cooling unit and an air conditioning unit are modular with respect to each other, they can be mounted to a vehicle body in an integrated manner. In particular, in a configuration in which a cooling unit includes a condenser that constitutes a refrigeration cycle together with an element of an air conditioning unit, the piping, wiring and the like thereof can be made compact, thereby contributing to a reduction in size and weight of a vehicle overall.

In the above aspect, a configuration may be provided, wherein the air conditioning unit includes a cooling assisting structure for assisting a cooling function of the cooling unit.

According to the above aspect, owing to the cooling assisting structure, a cooling function of the air cooling unit can be assisted by using, for example, cooling air and condensed water from an air conditioning unit. As a result, it is possible to reduce the performance requirements with respect to the cooling unit alone, and the cooling unit can be reduced in size and weight.

In the above aspect, a configuration may be provided in which the vehicle front portion structure further includes: an air conditioning unit for air conditioning a cabin, which is provided at a vehicle front in with respect to the dash panel; an electric motor that forms at least a part of the power unit, or an electric motor that is provided independently of the power unit and generates a driving force for running a vehicle; and a battery which is modular such that it can be handled in an integrated manner with the air conditioning unit, and which stores electricity supplied to the electric motor.

According to the above aspect, a part or all of a power unit provided rearward in a vehicle front-rear direction with respect to a front bumper is configured by an electric motor, or an electric motor that generates a driving force for running a vehicle is provided separately from the power unit. The electric motor is operated by electricity stored in a battery. The battery is modular with respect to an air conditioning unit, and therefore may be mounted in an integrated manner therewith to a vehicle body.

In the above aspect, a configuration may be provided, wherein a module comprising the battery and the cooling unit is inserted from a vehicle front side through an opening portion provided at the dash panel, and is detachably supported with respect to the dash panel, and at least a portion of the battery may be positioned at a rear in a vehicle front-rear direction with respect to the dash panel.

According to the above aspect, a module comprising a battery and a cooling unit may be inserted with respect to a dash panel from a vehicle front side through an opening portion, and at least a portion of the battery may be positioned at a rear in a vehicle front-rear direction with respect to the dash panel. In this state, the battery is mounted to the vehicle body such that it is directly or indirectly supported by the dash panel. Thus, the battery, which is a heavy component, can be provided closer to a center of gravity of a vehicle, and this contributes to achieving an appropriate load bearing balance between the front and rear wheels. Further, during maintenance of a battery, by removing the supported state with respect to the dash panel, and moving a module comprising the battery and the cooling unit in a vehicle front direction, the battery can be exposed such that maintenance can be performed thereon. In other words, in the above aspect, it is possible to perform maintenance of a battery without taking off parts at a cabin side.

In the above aspect, a configuration may be provided, wherein the air conditioning unit comprises a battery cooling structure for cooling the battery.

According to the above aspect, a battery can be cooled by a battery cooling structure due to using, for example, cooling air or condensed water from an air conditioning unit. This contributes to improving the performance and endurance of the battery.

In the above aspect, a configuration may be provided, wherein the cooling unit is positioned at a vehicle front with respect to a floor tunnel that opens at a lower portion in a vehicle vertical direction of the dash panel, and the vehicle front portion structure further comprises a seal structure that seals between a peripheral edge portion not including a lower edge in a vehicle vertical direction of the cooling unit, and an opening edge portion of the floor tunnel.

According to the above aspect, air supplied to a heat exchange at a cooling unit is expelled via a floor tunnel. Thus, since a floor tunnel having little air flow resistance is configured as an air exhaust route, heat exchange at the cooling unit is enhanced, and a cooling effect accompanying the running of a vehicle is improved.

In the above aspect, a configuration may be provided, wherein the vehicle front portion structure further comprising a flow adjusting member provided below the cooling unit in a vehicle vertical direction, for generating a negative pressure at a rear in a vehicle front-rear direction with respect to the cooling unit accompanying the running of a vehicle.

According to the above aspect, a running air flow is regulated at a flow adjusting member and a negative pressure is generated. Thereby, expulsion of air from a cooling unit, that is, an air inflow with respect to the cooling unit, is promoted. As a result, a heat exchange at the cooling unit is further promoted, and a cooling effect accompanying the running of a vehicle is further improved.

In the above aspect, a configuration may be provided, wherein the vehicle front portion structure further comprising a duct structure for guiding air from an air take-in portion, which opens downwards in a vehicle vertical direction at a vehicle front with respect to the cooling unit, to the cooling unit.

According to the above aspect, air flows in from an air take-in portion in front of a cooling unit and through a duct structure to the cooling unit, and air supplied to a heat exchange at the cooling unit is expelled to outside a vehicle via a floor tunnel. Thereby, an air inflow resistance and an air outflow resistance with respect to the cooling unit are both decreased, a heat exchange at the cooling unit is further promoted, and a cooling effect concomitant with the running of a vehicle is further improved.

Effect of the Invention

As explained above, the vehicle front portion structure according to the present invention has the excellent effect of allowing a wheel base to be lengthened without increasing the size of a vehicle body.

BRIEF DESCRIPTION OF THE DRAWINGS

FIG. 3 is a plan view showing a mounting structure of a power unit constituting a vehicle front portion structure according to an embodiment of the present invention.

BEST MODE FOR IMPLEMENTING THE INVENTION

In the following, an explanation of a vehicle front portion structure 10 according to an embodiment of the present invention is made with reference to FIGS. 1-11. A configuration of a vehicle body 11 will be explained first, followed by an explanation of a mounting structure of each part (unit) mounted at vehicle body 11. In the figures, arrow FR indicates a front direction in a vehicle front-rear direction, arrow UP indicates upwards in a vehicle vertical direction, arrow IN indicates a vehicle width direction inner side, and arrow OUT indicates a vehicle width direction outer side.

Schematic Configuration of Vehicle Body

Figure 1:
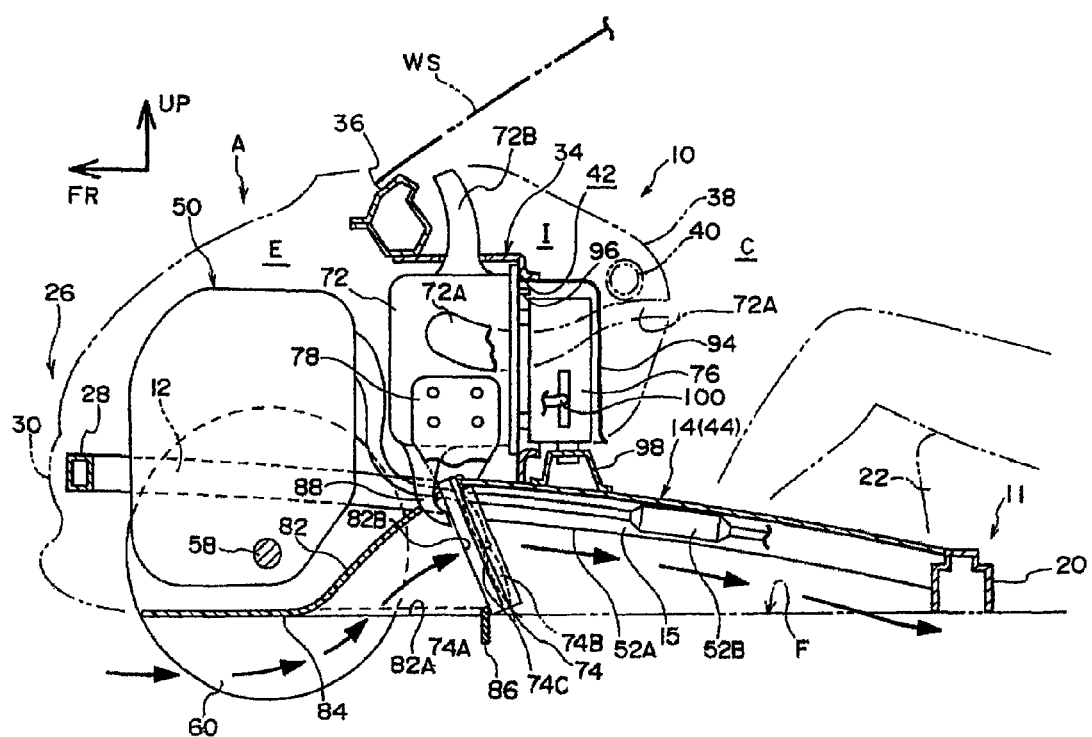
FIG. 1 is a side sectional view schematically showing a vehicle front portion structure according to an embodiment of the present invention.
Figure 2:
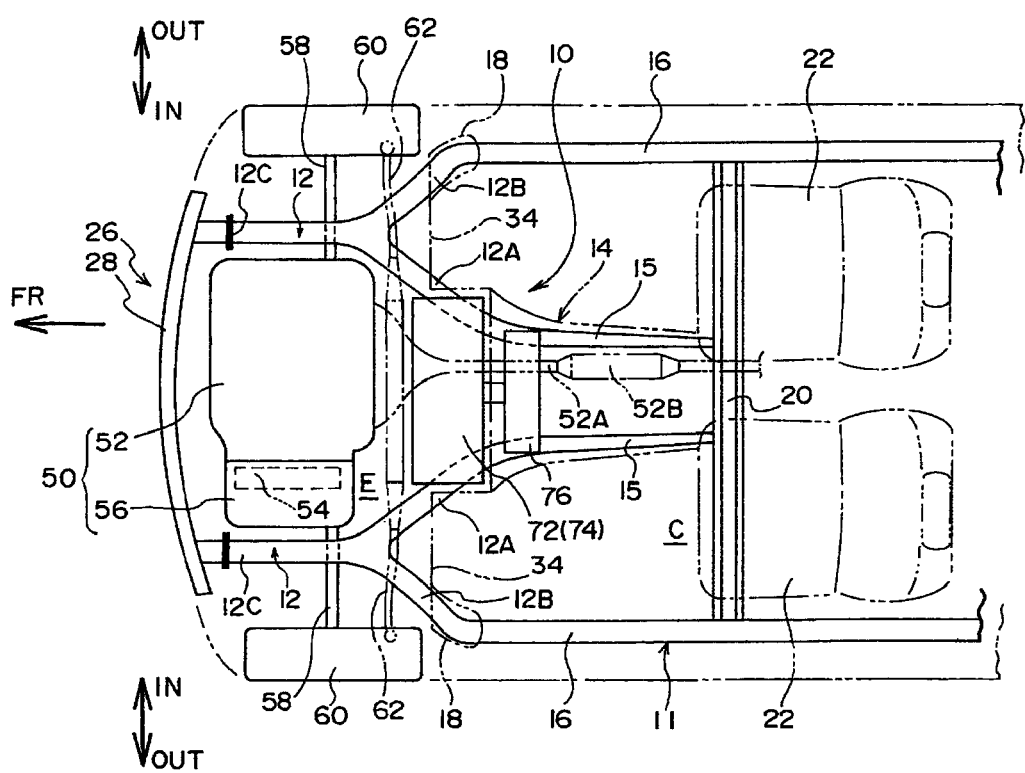
FIG. 2 is a plan view schematically showing a vehicle front portion structure according to an embodiment of the present invention.
Figure 10:
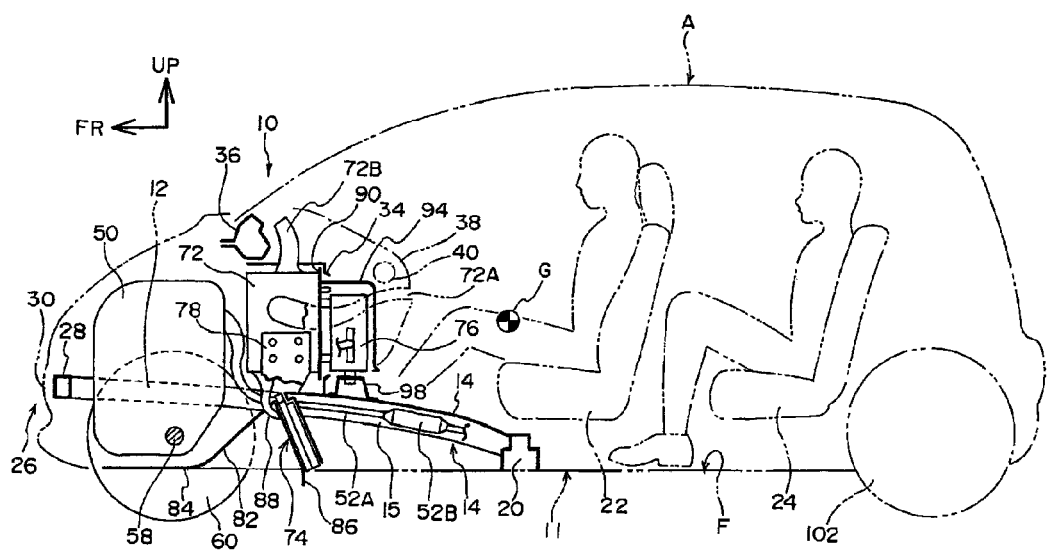
FIG. 10 is a side sectional view showing a schematic overall configuration of a vehicle to which has been applied a vehicle front portion structure according to an embodiment of the present invention.

FIG. 10 is a side sectional view showing a schematic overall configuration of a vehicle A to which has been applied vehicle front portion structure 10. FIG. 1 is a side sectional view schematically showing vehicle front portion structure 10, and FIG. 2 is a sectional plan view schematically showing vehicle front portion structure 10. As shown in these figures, vehicle body 11 is provided with a pair of left and right front side members 12 as framework members that have a length in a vehicle front-rear direction.

Vehicle front-rear direction rear portions 12A of front side members 12 continue to a front end in a vehicle front-rear direction of tunnel side members 15 that extend in a vehicle front-rear direction along a floor tunnel 14 formed at a vehicle floor F. Front side members 12 are positioned at an outer side in a vehicle width direction with respect to tunnel side members 15, and rear portions 12A of front side members 12 that are connected thereto are disposed at an angle with respect to a vehicle front-rear direction. Thereby, as shown in FIG. 2, left and right front side members 12 and tunnel side members 15 constitute a vehicle body framework having a substantially "Y" shape in plan view in vehicle front portion structure 10. Further, left and right tunnel side members 15 are each fixed at a corner portion formed at an upper side of floor tunnel 14. In this way, tunnel side members 15 arranged at an upper portion of floor tunnel 14 continue in substantially a straight line in a side view with respect to front side members 12, and a kick portion (prominent kick portion) is not formed between tunnel side members 15 and front side members 12.

Figure 8:
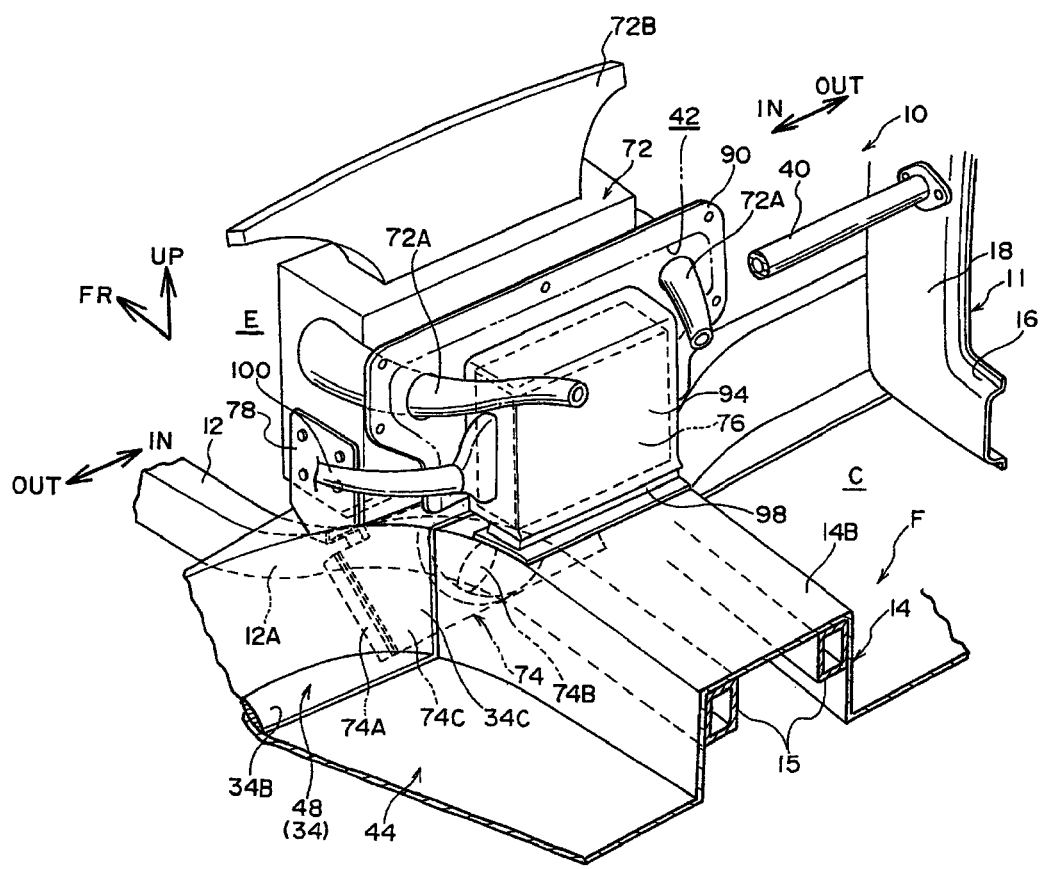
FIG. 8 is an enlarged perspective view showing a mounting structure of a battery that constitutes a vehicle front portion structure according to an embodiment of the present invention.

Further, in the present embodiment, front side members 12 include forking portions 12B that fork towards a vehicle outer side with respect to rear portions 12A. Forking portions 12B continue to a front end in a vehicle front-rear direction of rockers 16 which are framework members of that extend in a vehicle front-rear direction at outer ends in a vehicle width direction of vehicle body 11. As shown in FIGS. 2 and 8, front ends of rockers 16 are connected to lower ends in a vehicle vertical direction of front pillars 18 which are framework members that extend in a vehicle vertical direction.

As shown in FIG. 1, in vehicle body 11, rear ends in a vehicle front-rear direction of floor tunnel 14 and tunnel side members 15 are fixed to a vehicle front surface of a cross member 20, which extends in a vehicle width direction and is connected to left and right rockers 16. Cross member 20 is a framework member for supporting a front seat 22 of vehicle body 11. As a result, vehicle body 11 has a configuration in which floor tunnel 14 is not above vehicle floor F to the rear of cross member 20, and each portion in a vehicle width direction of floor F for rear seat 24 is configured to be low and flat.

Figure 4A:
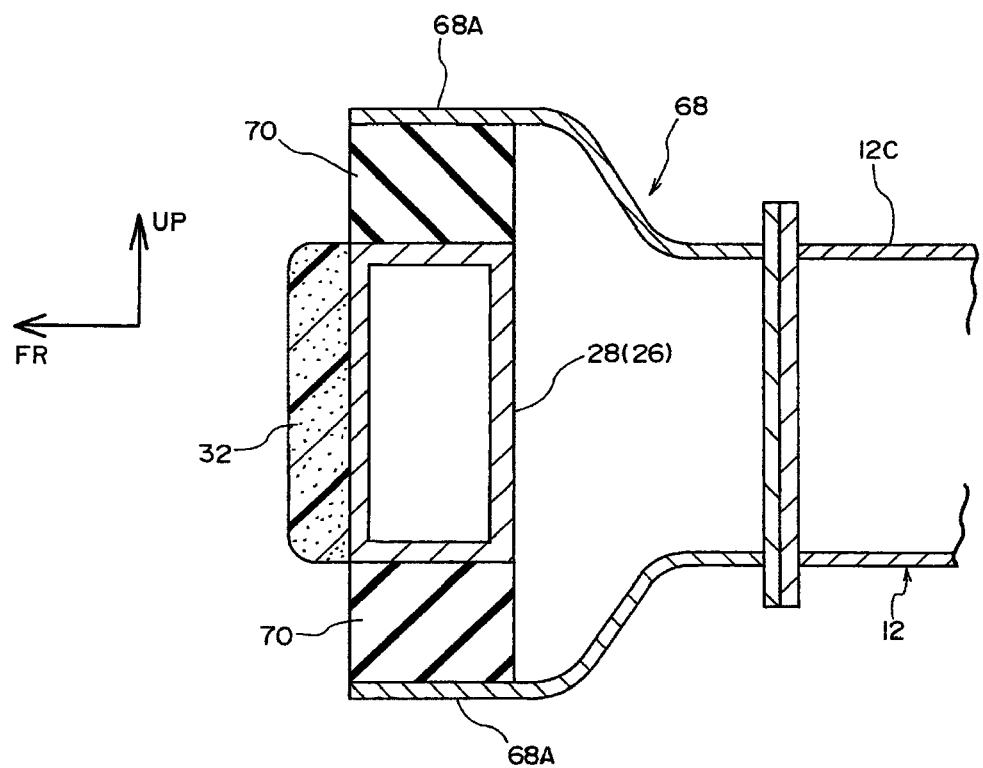
FIG. 4A is a sectional view taken along line 4A-4A of FIG. 3.
Figure 4B:
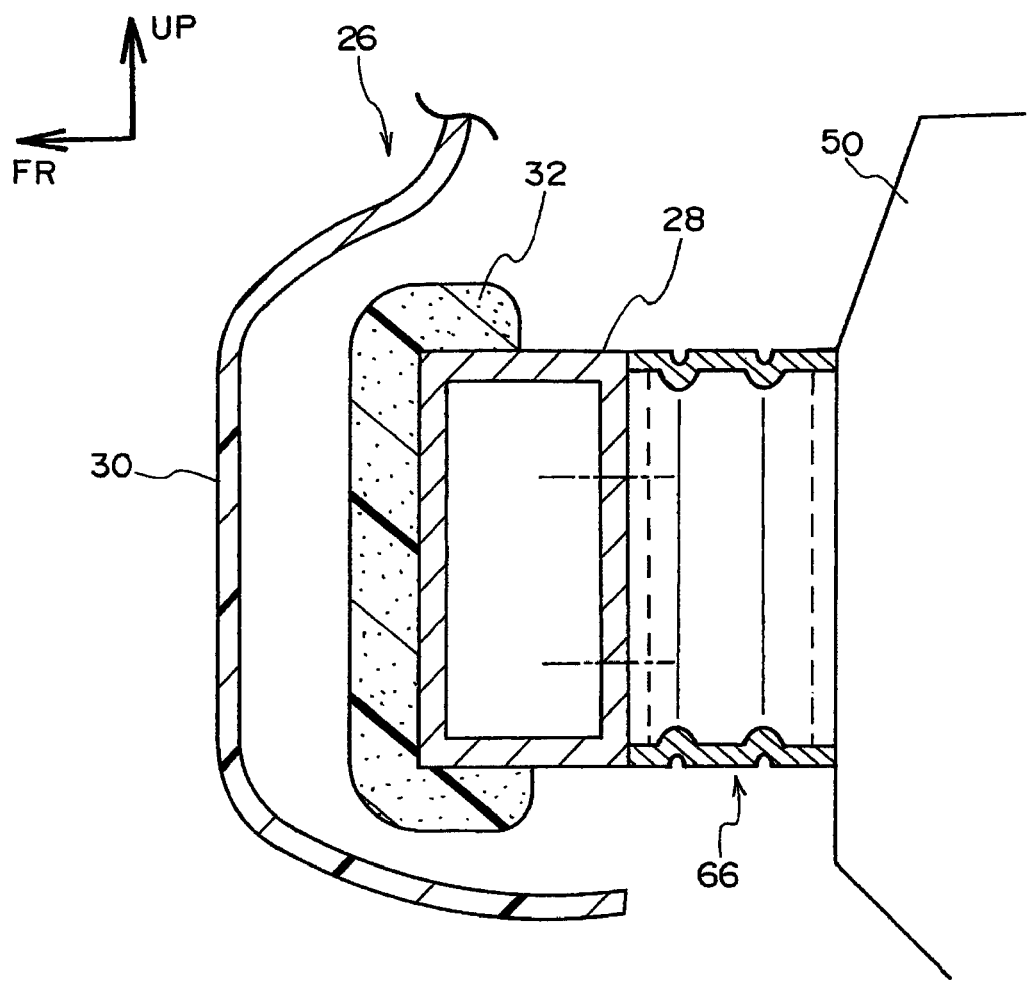
FIG. 4B is a sectional view taken along line 4B-4B of FIG. 3.

Between front ends 12C in a vehicle front-rear direction of left and right front side members 12 spans a bumper reinforcement 28 as a bumper framework member that constitutes a front bumper 26 that extends in a vehicle width direction. As shown in FIG. 4A, in front bumper 26, bumper reinforcement 28 is covered at a vehicle front side by a front bumper cover 30, and between bumper reinforcement 28 and front bumper cover 30 is arranged an absorber 32. In the present embodiment, a crash box 68 described below is provided between bumper reinforcement 28 and each front end 12C of front side members 12.

According to the above, in vehicle body 11, in a frontal impact, a load is transmitted mainly towards a vehicle front-rear direction rear portion via bumper reinforcement 28, front side members 12, tunnel side members 15 and rockers 16. Further, although not shown in the drawings, under a floor at a rear portion of vehicle body 11, a framework member (other than rockers 16), for transmitting a load which has been transmitted from tunnel side members 15 to cross member 20 to a rear in a vehicle front-rear direction, extends in a vehicle front-rear direction.

As shown in FIG. 1, in vehicle body 11, an engine room E which is a vehicle front portion space in which is arranged a power unit 50, an air conditioning unit 72, a cooling unit 74, which are each described below, and the like, is formed rearward in a vehicle front-rear direction with respect to bumper reinforcement 28. A rear end in a vehicle front-rear direction of engine room E is defined by a dash panel 34 that partitions engine room E and a cabin C. As shown in FIGS. 2 and 8, dash panel 34 spans the entire width between left and right front pillars 18, and extends in a vehicle vertical direction. As shown in FIG. 1, at an upper end in a vehicle vertical direction of dash panel 34 is connected a cowl reinforcement 36 that constitutes a cowl. Cowl reinforcement 36 is fixed to and thereby supports a lower end in a vehicle vertical direction of a windshield glass WS.

Dash panel 34 is covered by an instrument panel 38 from a cabin C side. Instrument panel 38 forms instrument panel space I, at which a battery 76 is arranged between instrument panel 38 and dash panel 34. As shown in FIG. 8, an instrument panel reinforcement 40 which is a framework member that spans between left and right front pillars 18 is arranged at instrument panel space I. Although not shown in the drawings, part of a steering device, various airbag devices and the like are arranged in instrument panel space I.

Figure 5:
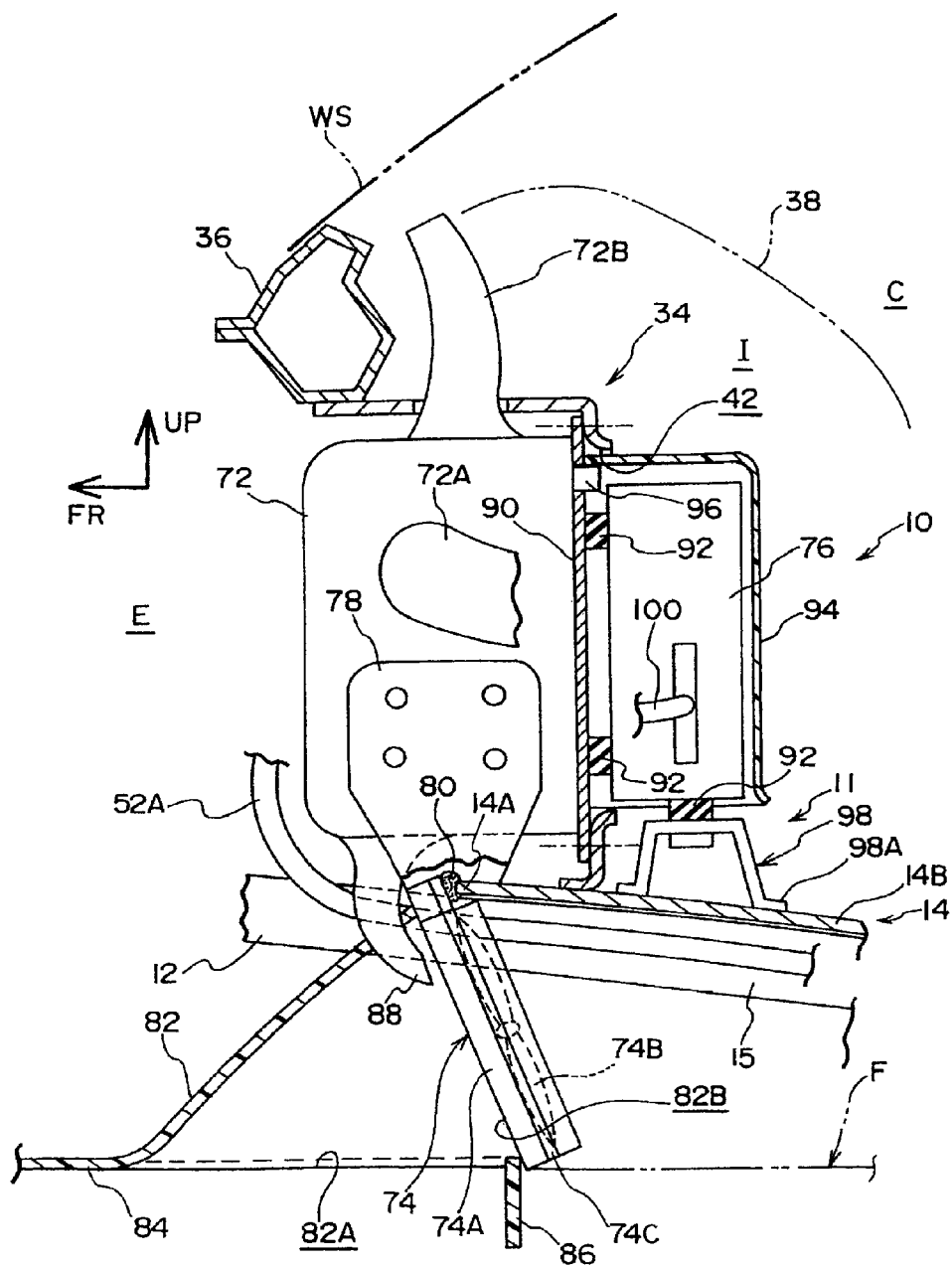
FIG. 5 is an enlarged side sectional view showing a mounting structure of an air conditioning unit, a cooling unit and a battery constituting a vehicle front portion structure according to an embodiment of the present invention.
Figure 9:
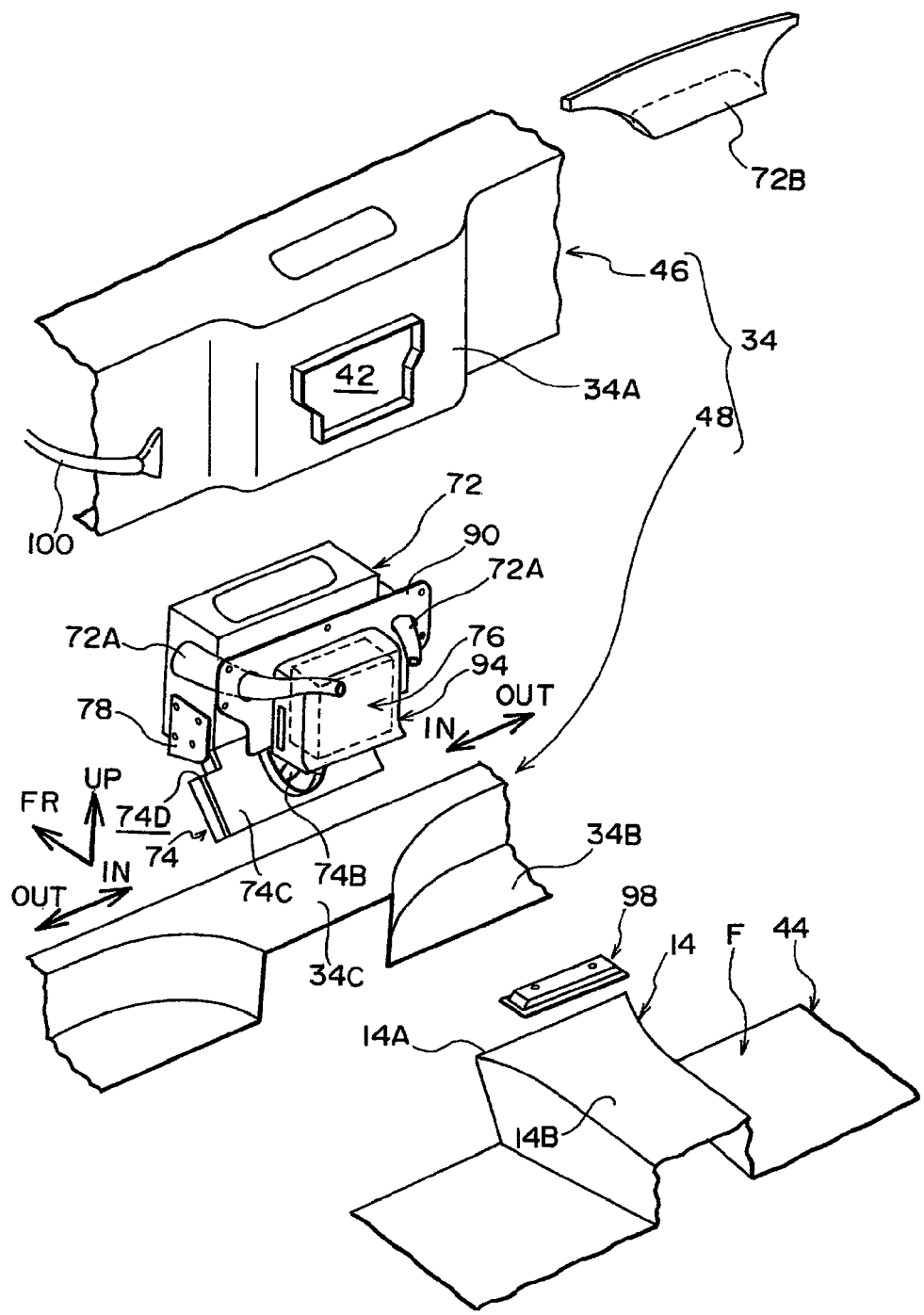
FIG. 9 is an exploded perspective view showing a mounting structure of a battery that constitutes a vehicle front portion structure according to an embodiment of the present invention.

As shown in FIGS. 5, 8 and 9, a window portion 42 for accessing instrument panel space I from an engine room E side is formed in dash panel 34. In the present embodiment, window portion 42 is formed in substantially a "T" shape when viewed from the rear, at a projecting portion 34A which projects towards a rear in a vehicle front-rear direction at a center portion in a vehicle width direction of dash panel 34.

Further, as shown in FIGS. 8 and 9, at a lower portion in a vehicle vertical direction of dash panel 34 is connected a front end portion in a vehicle front-rear direction of a floor panel 44 at which is formed floor tunnel 14. Specifically, dash panel 34 includes a floor connection portion 34B connected to a general portion (other than floor tunnel 14) of floor panel 44, and a tunnel connection portion 34C connected to floor tunnel 14. Tunnel connection portion 34C is superposed on floor tunnel 14 in a vehicle vertical direction, and thereby, as shown in FIG. 5, an opening end 14A that opens towards a vehicle front direction is positioned in engine room E.

As shown in FIG. 9, dash panel 34 explained above is configured by connecting an upper dash panel 46 to a lower dash panel 48. Upper dash panel 46 includes a projecting portion 34A (window portion 42) and lower dash panel 48 includes floor connection portion 34B and tunnel connection portion 34C. In FIG. 8, upper dash panel 46 is removed, and window portion 42 is indicated with a two-dot chain line.

Mounting Structure of Power Unit System

Vehicle A is provided with power unit 50 for generating running driving force. As shown in FIGS. 2 and 3, power unit 50 is provided with an engine 52 which is an internal combustion engine and an electric motor 54 as drive sources Thus, vehicle A is a hybrid vehicle with two drive sources. Specifically, power unit 50 includes as main elements engine 52 and transaxle 56 which is connected to engine 52 such that it can transmit power thereto. Transaxle 56 includes electric motor 54, a generator, a power split device r, a transmission such as a continuously variable transmission (each not shown) and the like. Further, in the present embodiment, transaxle 56 includes an inverter electrically connected to electric motor 54, generator and a battery 76 which is described below. Thus, power unit 50 according to the present embodiment may be thought of as a power plant.

As shown in FIG. 2, a drive shaft 58, which is an output shaft of power unit 50, is connected to a front wheels 60 such that it may transmit driving force thereto. Each front wheel 60 is connected to a tie rod 62 that constitutes a steering device such that it may be turned by steering a steering wheel.

As shown in FIGS. 1-3, power unit 50 is arranged near the rear of bumper reinforcement 28 in a vehicle front-rear direction. In other words, in vehicle front portion structure 10, a radiator or an air conditioner condenser, which are provided in a normal vehicle, are not provided between bumper reinforcement 28 and power unit 50. In vehicle front portion structure 10, power unit 50 is provided near to bumper reinforcement 28 utilizing a space obtained by not providing the radiator or air conditioner condenser thereat.

Further, as shown in FIG. 3, in vehicle front portion structure 10, power unit 50 is supported by vehicle body 11 via front side members 12 and bumper reinforcement 28. Specifically, power unit 50 is supported elastically near front ends 12C at left and right front side members 12 via left and right engine mounts 64. Each engine mount 64 is a member in which rubber is filled between a metal inner tube and a metal outer tube, along a common axial direction of the tubes. Each engine mount 64 may have an outer tube fixed to front side members 12 and an inner tube fixed to power unit 50, thereby elastically supporting power unit 50 at front side members 12.

A vehicle front side portion of power unit 50 and a rear surface of bumper reinforcement 28 are connected via a connection members 66. Each connection member 66 is removably connected to at least one of power unit 50 or bumper reinforcement 28 by fastening using a bolt and nut (not shown) or the like. Between each left and right front side member 12 and bumper reinforcement 28 is provided a crash box 68. Crash box 68 is configured to absorb a load (impact energy), which is above a predetermined value and is input from a vehicle front, by being axially compressed and crushed in a vehicle front-rear direction. As shown in FIG. 4A, in the present embodiment, rubber bushings 70 are provided between crash box 68 and bumper reinforcement 28.

Rubber bushings 70 are provided so as to sandwich bumper reinforcement 28 from both sides in a vehicle vertical direction, and are supported from both sides in the vehicle vertical direction by upper and lower supporting portions 68A of crash boxes 68. Therefore, in the present embodiment, bumper reinforcement 28 and power unit 50, which are connected via connection member 66, are supported elastically (floating support) via left and right engine mounts 64 and left and right rubber bushings 70.

As a result, in vehicle front portion structure 10, a vibration absorbing effect, in which the transmission of vibrations from power unit 50 to vehicle body 11 is suppressed, can be obtained. As a result, a space is formed between absorber 32, which is attached to bumper reinforcement 28, and front bumper cover 30, and interference between power unit 50 side and a vehicle body 11 side that accompanies vibration can be prevented. In a configuration in which absorber 32 is provided at front bumper cover 30, a space may be configured between absorber 32 and bumper reinforcement 28.

In vehicle front portion structure 10, connection member 66 is axially compressed and crushed in a vehicle front-rear direction by a load above a predetermined value input from a vehicle front direction; thereby, it is configured to absorb a load (an impact energy). That is, connection member 66 is provided between bumper reinforcement 28 and power unit 50, as a member corresponding to a crash box. As a result, in vehicle front portion structure 10, owing to connection member 66 and crash box 68, the transmission of an impact load to power unit 50 supported by front side members 12 can be suppressed.

In the present embodiment, as shown in FIG. 1, an exhaust pipe 52A of engine 52 that constitutes power unit 50 extends out from a vehicle upper rear portion at engine 52, and passes through floor tunnel 14 to a vehicle outer side (and is connected to a muffler or the like provided at a rear portion in a vehicle front-rear direction). In the present embodiment, a catalytic converter 52B for purifying exhaust gas of engine 52 is arranged within floor tunnel 14.

Mounting Structure of Air Conditioning Unit, Cooling Unit, and Battery

As shown in FIGS. 1 and 2, cooling unit 74 and air conditioning unit 72 for air conditioning cabin C are provided in engine room E to the rear of power unit 50 in vehicle front-rear direction. Further, battery 76 is provided in instrument panel space I to the rear of air conditioning unit 72 for air conditioning in a vehicle front-rear direction.

Air conditioning unit 72 is configured by accommodating, in an air conditioning case, devices for air conditioning of a vehicle, such as an evaporator for refrigeration that constitutes a refrigeration cycle, a heater core for heating, a blower for blowing air, and a damper device for switching an air flow outlet. In the example shown in FIG. 1 (see also FIG. 8), connection states of a register nozzle 72A, for blowing air towards a cabin occupant, and of a defroster nozzle 72B for blowing air to a windshield glass WS, are shown. Register nozzle 72A, and a foot nozzle for blowing air to the feet, a side register nozzle, and a rear seat nozzle for blowing air to a rear seat (each not shown) are each connected to air conditioning unit 72 after mounting air conditioning unit 72 to a vehicle.

Figure 7:
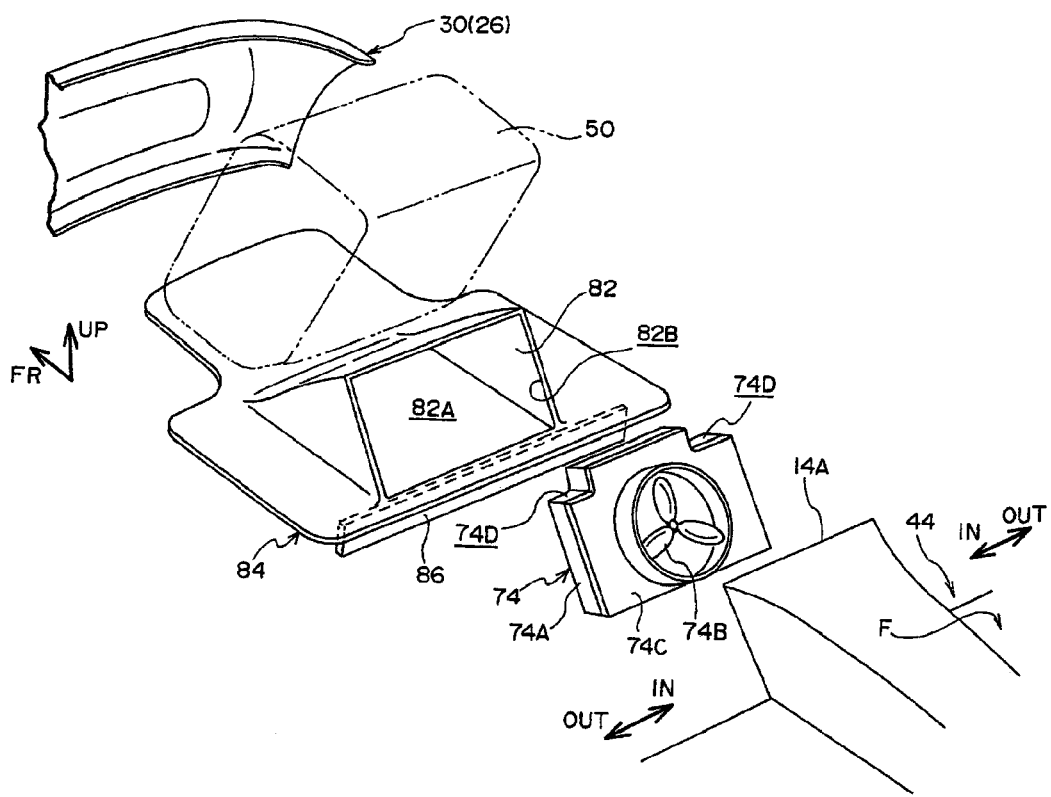
FIG. 7 is an exploded perspective view showing a structure of an air guide and air exhaust with respect to a cooling unit that constitutes a vehicle front portion structure according to an embodiment of the present invention.

Cooling unit 74, as shown in FIG. 7, includes as main elements a heat exchange portion 74A, a fan 74B for guiding cooling air to heat exchange portion 74A, and a fan shroud 74C that covers each of heat exchange portion 74A and fan 74B from peripheral edges thereof. Heat exchange portion 74A includes a radiator for cooling power unit 50 and a condenser that constitutes a refrigeration cycle of a vehicle air conditioning device, which are each modular components. In other words, heat exchange portion 74A is configured with a heat exchanger between engine coolant water and cooling air, and a heat exchanger between air conditioning coolant medium and cooling air.

As shown in FIG. 9, cooling unit 74 is modular with respect to air conditioning unit 72 (air conditioning unit 72 is omitted from FIG. 7). In the present embodiment, air conditioning unit 72 and cooling unit 74 are connected by left and right brackets 78 such that they may be handled in an integrated manner. Although not shown in the drawings, an air conditioning condenser that constitutes heat exchange portion 74A, before mounting to a vehicle, is connected to a pipe that is part of a coolant medium circulation path of air conditioning unit 72. As a result, although not shown in the drawings, a module that includes air conditioning unit 72 and cooling unit 74 in the present embodiment includes an expansion valve that constitutes a refrigeration cycle of a vehicle air conditioning device. Moreover, in the present embodiment, before mounting to a vehicle, wiring of fan 74B is electrically connected to necessary wiring of air conditioning unit 72.

Figure 6:
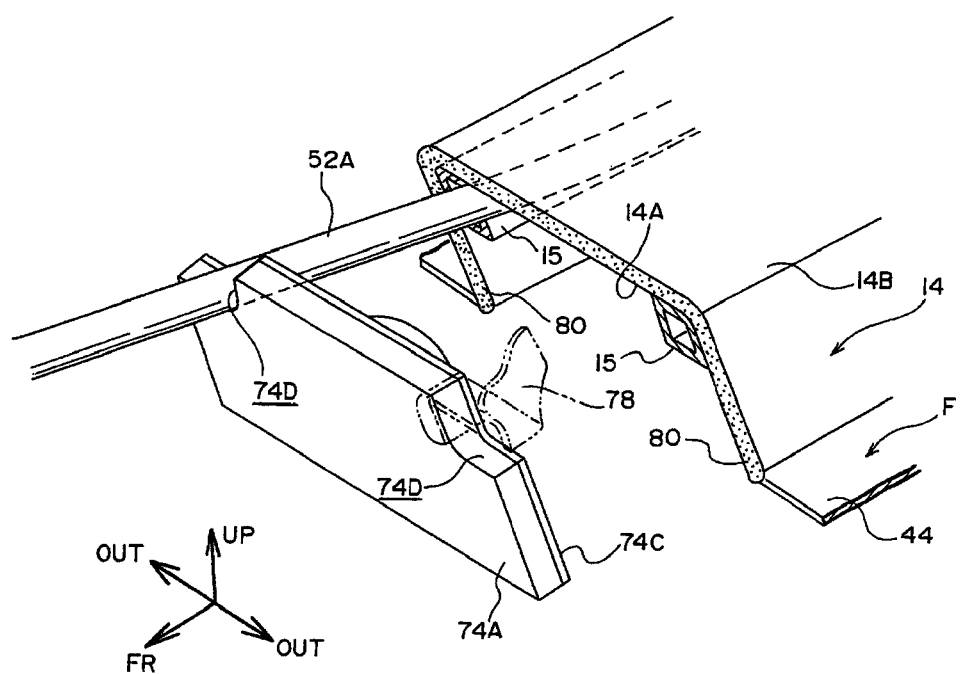
FIG. 6 is an exploded perspective view showing a structure of a seal between a cooling unit and a tunnel that constitute a vehicle front portion structure according to an embodiment of the present invention.

Cooling unit 74, which is modular with respect to air conditioning unit 72, is supported at a vehicle body as described below, and fan shroud 74C closes from a vehicle front direction an opening end 14A, which faces a vehicle front direction, of floor tunnel 14, via a seal member 80 as a seal structure (see FIG. 5). That is, as shown in FIG. 6, opening end 14A is configured so as to contact a peripheral edge portion of fan shroud 74C via seal member 80.

Therefore, in the present embodiment, cooling unit 74 may expel air (cooling air) supplied to a heat exchange at heat exchange portion 74A to outside of the vehicle via floor tunnel 14. In vehicle front portion structure 10 as described above, tunnel side members 15 and an exhaust pipe 52A pass through floor tunnel 14. As a result, as shown in FIG. 6, at respective corner portions of fan shroud 74C and heat exchange portion 74A, cutaway portions 74D are formed so as to allow tunnel side members 15 and exhaust pipe 52A to pass therethrough. Further, brackets 78 described above are fixed to side surfaces of cutaway portions 74D. Thereby, by moving a module comprising air conditioning unit 72 and cooling unit 74 from a vehicle front to a vehicle rear, the module may be attached at a predetermined position while allowing tunnel side members 15 to pass through cutaway portions 74D.

As shown in FIGS. 1 and 5, a duct 82 for introducing cooling air to heat exchange portion 74A is provided in vehicle front portion structure 10. Duct 82 includes a cooling air intake port 82A at a vehicle front direction with respect to heat exchange portion 74A, that opens downward in a vehicle vertical direction, and a cooling air supply port 82B that opens facing heat exchange portion 74A. Specifically, as shown in FIG. 7 which is an exploded perspective view, duct 82 is configured as above so as to push out a portion of an under cover 84, which covers engine room E from below in a vehicle vertical direction, upwards in a vehicle vertical direction.

As shown in FIGS. 5 and 7, in vehicle front portion structure 10, a flap 86 is provided as a flow adjusting member directly below cooling unit 74. Flap 86 projects further downward in a vehicle vertical direction than under cover 84 and is a plate shaped member that faces a vehicle front. Flap 86 receives running air flow of vehicle A, and is configured such that a negative pressure portion is generated to the rear thereof in a vehicle front-rear direction (at a downstream side of an air flow). Owing to this negative pressure, the passing of cooling air through heat exchange portion 74A can be promoted in vehicle front portion structure 10.

Further, as shown in FIG. 5, air conditioning unit 72 is provided with a cooling nozzle 88 as a cooling assisting structure for cooling unit 74. Cooling nozzle 88 is provided inserted into duct 82 and opens towards a vehicle front of heat exchange portion 74A. Air conditioning unit 72 is configured to blow air-conditioned air which has been cooled at an evaporator if, for example, a water temperature of a radiator that constitutes cooling unit 74 exceeds a predetermined temperature. For example, if, based on a signal from a water temperature sensor, it is judged that a water temperature of a radiator has exceeded a predetermined temperature, an air-conditioning ECU as a control device that controls an operation of air conditioning unit 72 operates (or continues to operate) a refrigeration cycle, and by opening a damper of cooling nozzle 88, air-conditioned air cooled at an evaporator is blown towards heat exchange portion 74A.

Battery 76 is an accumulator battery that stores electrical power for driving electric motor 54. Since battery 76 has a high density, it has sufficient charge capacity, and its dimensions are such that it may be arranged, via window portion 42 of dash panel 34, at a center portion in a vehicle width direction in instrument panel space I. As shown in FIG. 5, battery 76 is arranged at a vehicle front-rear direction rear side of air conditioning unit 72, and is modular with respect to air conditioning unit 72. In the present embodiment, air conditioning unit 72 and battery 76 are modular and can be handled in an integrated manner by fixing them to each other via a partition panel 90 and a rubber bushing 92. Thus, in the present embodiment, as shown in FIGS. 8 and 9, three parts (units), namely, air conditioning unit 72, cooling unit 74, and battery 76 are modular.

Moreover, as shown in FIGS. 5, 8 and 9, at partition panel 90 is provided a battery cooling duct 94 that covers battery 76 and that opens downwards in a vehicle vertical direction. Battery cooling duct 94 may be formed integrated with partition panel 90, or may be configured as a separate element (independent part) which is attached to partition panel 90. As shown in FIG. 5, air conditioning unit 72 is provided with a battery cooling air outlet 96 that opens to an upper portion in a vehicle vertical direction of battery cooling duct 94. In the present embodiment, battery cooling duct 94 and battery cooling air outlet 96 correspond to a battery cooling structure of the present invention.

Air conditioning unit 72 is configured such that if a temperature of battery 76 exceeds a predetermined temperature or the like, air-conditioned air cooled at an evaporator is blown from battery cooling air outlet 96. For example, if the above-described air conditioning ECU judges that a temperature of battery 76 has exceed a predetermined temperature based on a signal from a battery temperature sensor, it operates (or continues to operate) a refrigeration cycle, and by opening a damper of battery cooling air outlet 96, air-conditioned air cooled at an evaporator is blown to battery 76.

Battery 76 is accommodated within instrument panel space I via window portion 42 of dash panel 34 together with battery cooling duct 94. Thereby, of the modules battery 76, air conditioning unit 72, and cooling unit 74, battery 76 is arranged in instrument panel space I, and air conditioning unit 72 and cooling unit 74 are arranged in engine room E. Air conditioning unit 72 is arranged at an engine room E side by inserting it into projecting portion 34A of dash panel 34.

As shown in FIGS. 5 and 8, window portion 42 of dash panel 34 is closed by partition panel 90. Partition panel 90 is fixed to dash panel 34 at multiple locations of a peripheral edge of window portion 42 of dash panel 34, thereby closing window portion 42. In the present embodiment, partition panel 90 may be fixed to dash panel 34 by fastening such that it may be removed therefrom, and may be taken off during maintenance or the like.

Battery 76 is supported above floor tunnel 14 by a battery mounting bracket 98. Battery mounting bracket 98 has a length in a vehicle width direction, and has a hat shape that opens downwards in a vehicle vertical direction, when seen in a section taken along a direction perpendicular to the length direction. A flange 98A that extends from an edge of the opening of battery mounting bracket 98 is welded to an upper surface 14B of floor tunnel 14, and thereby battery mounting bracket 98 forms a closed section structure with floor tunnel 14. Battery 76 is fastened to battery mounting bracket 98 at multiple locations (two locations in the example shown in FIG. 9) separated in a length direction, and is thereby supported elastically via rubber bushing 92.

Modules battery 76, air conditioning unit 72 and cooling unit 74 are fixed to dash panel 34 of partition panel 90, and are supported elastically by battery mounting bracket 98 of battery 76, and are thereby supported overall by vehicle body 11. Considering only battery 76 alone, it may be thought of as being elastically supported (floating support) by vehicle body 11 via rubber bushing 92 at a partition panel 90 side and rubber bushing 92 at a battery mounting bracket 98 side.

The above-described battery 76 is electrically connected to (an inverter for) electric motor 54 via a high voltage cable 100, as shown in FIG. 8. High voltage cable 100 passes through a cable through-hole (not shown) formed in dash panel 34 (upper dash panel 46) and is led into engine room E from instrument panel space I.

The following describes the operation of the present embodiment.

Operation and Effect Based on Arrangement of Power Unit

As shown in FIG. 1, in vehicle front portion structure 10 having the above configuration, power unit 50 is arranged directly behind bumper reinforcement 28, namely at a front end portion in a vehicle front-rear direction within engine room E. In other words, in vehicle front portion structure 10, power unit 50 is arranged further to a vehicle front compared to a comparative example in which a radiator and an air conditioner condenser are arranged at a front end portion in a vehicle front-rear direction within engine room E (power unit 50 is moved towards the front). As a result, in vehicle front portion structure 10, it is possible to provide front wheel 60 towards a vehicle front together with power unit 50, and thereby lengthen a wheel base without enlarging vehicle body 11. With this configuration, vehicle front portion structure 10 contributes to the effective lightening of the entirety of vehicle A by lightening vehicle body 11.

Further explanation of this point is given in the following. If a vehicle body is lightened by, for example, altering the material of a body outer plate (such as by making it of high-tensile steel or a resin), or by lightening an internal material, power unit 50 becomes comparatively heavier. As a result, as indicated by the upper image showing a comparative example in FIG. 11, if only vehicle body 200 is lightened, the load distribution balance between front wheel 60 and rear wheel 102 becomes unbalanced. Specifically, the proportion of load distribution borne by front wheel 60 increases, and it becomes necessary to lengthen the wheel base. As shown in the center image of FIG. 11, in order to lengthen a wheel base (see arrow A), a vehicle body 210 is lengthened to the rear in a vehicle front-rear direction compared to vehicle body 200 (see arrow B), and since this enlarges the vehicle body, the effect of lightening the vehicle body is reduced.

Figure 11:
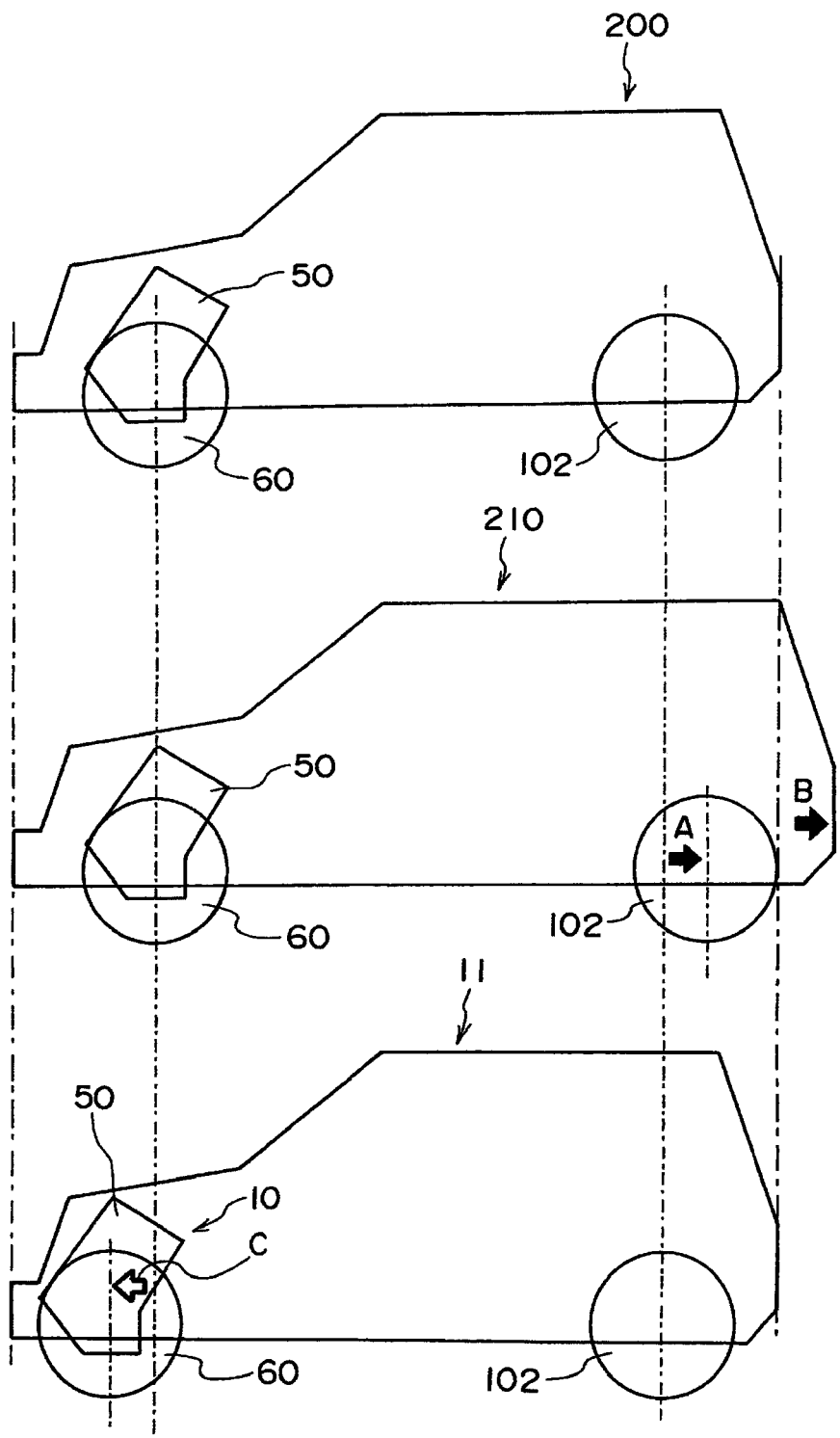
FIG. 11 is a figure used to explain, through a comparison with comparative examples, the effect of extending a wheel base without enlarging a vehicle of the present invention, which is achieved by a vehicle front portion structure according to an embodiment of the present invention. Therein, the upper image is a schematic side view of a vehicle according to a comparative example, the middle image is a schematic side view of a vehicle according to another comparative example, and the lower image is a schematic side view of a vehicle according to an embodiment of the present invention.

As shown schematically in the lower image of FIG. 11, vehicle front portion structure 10 has a configuration in which a wheel base is lengthened by moving power unit 50 towards a vehicle front. As a result, it is possible to realize a vehicle body 11 which is not lengthened compared to vehicle body 200, but which has a lengthened wheel base (see arrow C) compared to vehicle body 200. By lengthening the wheel base in a configuration in which a lightened vehicle body 11 is used, it is possible to obtain a favorable load distribution balance between front and rear wheels. Therefore, as described above, vehicle front portion structure 10 contributes to the effective lightening of the entirety of vehicle A by lightening vehicle body 11.

Further, in vehicle front portion structure 10, compared to the above described vehicle body 200 and vehicle body 210, front wheel 60 is moved further towards a vehicle front, and therefore a front overhang is shortened. This contributes to improved maneuverability and treatment performance to vehicle A. Further, in vehicle front portion structure 10, since power unit 50 is arranged at a front end portion in a vehicle front-rear direction of engine room E, it is possible to dispense with a support member or the like at each front end 12C of front side members 12 for supporting a radiator or air conditioning condenser. Moreover, in vehicle front portion structure 10, since air conditioning unit 72 is arranged to the rear of power unit 50 in a vehicle front-rear direction and between the front and rear wheels, a weight balance of vehicle A is improved, thereby contributing to a substantial improvement in maneuverability.

Moreover, in vehicle front portion structure 10, power unit 50 is supported by front side members 12 and bumper reinforcement 28. As a result, it is possible to attach bumper reinforcement 28 and power unit 50, which are connected by connection member 66, to front side members 12 as a module from a vehicle front. Thereby, an operation of lifting up vehicle body 11 in order to attach power unit 50 or the like becomes unnecessary, and the manufacturability and maintenance properties of vehicle A can be improved.

In vehicle front portion structure 10, power unit 50 is arranged at a front end portion in a vehicle front-rear direction of engine room E. Thereby, in a frontal collision of vehicle A, the movement of power unit 50, which has a large inertial mass, towards a front in a vehicle front-rear direction can be quickly stopped.

In vehicle front portion structure 10, power unit 50 is arranged at a front end portion in a vehicle front-rear direction of engine room E. Thereby, a configuration can be realized in which tunnel side members 15 that are arranged in floor tunnel 14 and front side members 12 are connected. As a result, in a frontal collision of vehicle A, a load is transmitted to a rear in a vehicle front-rear direction via front side members 12 and tunnel side members 15. In other words, near a center of gravity G of vehicle A (see FIG. 10), a load is transmitted towards the rear. Consequently, a necessary strength of front side members 12 and tunnel side members 15 to resist bending due to a front impact load can be reduced.

In a standard framework configuration in which a front side member and a side member under a floor are connected by a kick portion that inclines with respect to a vehicle vertical direction, an impact load is supported at the side member under the floor, which is greatly separated downwards in a vehicle vertical direction from a load input point (near center of gravity G in a vehicle vertical direction) of the front side member. As a result, the above-mentioned necessary strength to resist the bending of the kick portion increases, and as a result an excessive amount of reinforcement must be provided with respect to other requirements. Consequently, the weight of vehicle body 11 increases in this comparative example.

In contrast, in vehicle front portion structure 10, owing to the above configuration in which front side members 12 are connected to tunnel side members 15, which do not pass under a floor, the above-mentioned necessary strength to resist bending of the kick portion decreases, thereby contributing to the lightening of vehicle body 11.

Effect of Arranging a Cooling Unit and Air Conditioning Unit

In vehicle front portion structure 10, in which power unit 50 is arranged at a front end portion in a vehicle front-rear direction of engine room E as described above, there is greater freedom to arrange other parts such as air conditioning unit 72 and cooling unit 74. In vehicle front portion structure 10, air conditioning unit 72 and cooling unit 74 are arranged in engine room E to the rear of power unit 50 in a vehicle front-rear direction. Thereby, it is possible to make air conditioning unit 72 and cooling unit 74 modular. By making air conditioning unit 72 and cooling unit 74 modular, they can be attached as an integrated element. Consequently, the attachability of air conditioning unit 72 and cooling unit 74 with respect to vehicle body 11 can be improved.

In vehicle front portion structure 10, by making air conditioning unit 72 and cooling unit 74 modular, wiring and piping can be connected before mounting to a vehicle. As a result, it is possible to reduce wiring and piping operations performed after mounting to a vehicle, and this also improves attachability of air conditioning unit 72 and cooling unit 74 with respect to vehicle body 11.

Moreover, in vehicle front portion structure 10, cooling nozzle 88 is provided for supplying air-conditioned air from air conditioning unit 72 to heat exchange portion 74A of cooling unit 74. As a result, by using air conditioned air from air conditioning unit 72, cooling of cooling unit 74 can be promoted. Specifically, when a water temperature of a radiator that constitutes heat exchange portion 74A is high, cooling of cooling water at a radiator can be promoted by air-conditioned air cooled at an evaporator.

In this way, in vehicle front portion structure 10, in special environments in which a water temperature of a radiator increases (such as in traffic congestion in the summer, or long hill climbing), by using air conditioning unit 72, cooling performance of a radiator can be improved. Thereby, in vehicle front portion structure 10, it is not necessary to ensure favorable cooling performance in special environments only via an air flow obtained by a running air flow or via the operation of fan 74B. Consequently, in vehicle front portion structure 10, it is possible to realize a reduction in the size of a radiator, and an optimal specification of heat exchange portion 74A which includes the radiator. As a result, a circulation amount of coolant water may be reduced, and fuel efficiency during normal running can be improved.

In vehicle front portion structure 10, as shown in FIG. 1, during the running of vehicle A, air introduced from a lower portion (under a floor) of under cover 84 is supplied via cooling air intake port 82A of duct 82 to a heat exchange at heat exchange portion 74A. This air passes through heat exchange portion 74A due to a negative pressure that is generated at flap 86 (and due to the operation of fan 74B), flows into floor tunnel 14, passes through floor tunnel 14 and is smoothly expelled to under floor F. Thereby, efficient heat exchange at heat exchange portion 74A can be achieved using an air flow under the floor and floor tunnel 14.

In a comparative example in which a cooling unit comprising a radiator and an air conditioning condenser is arranged at a frontmost portion in engine room E, an engine is arranged at the rear of the cooling unit in a vehicle front-rear direction. As a result, a flow of cooled air that has passed through the cooling unit is blocked by the engine and cannot flow smoothly through engine room E. Further, in this comparative example, an opening for introducing the cooling air flow to the cooling unit must be formed in a bumper cover, and therefore a large air resistance is generated, especially at high speeds. In particular, in hybrid vehicles or the like, in which little heat is generated from an engine, although the performance requirements of a radiator are reduced, if a cooling unit that includes a radiator is arranged as in the above-described comparative example, fuel efficiency becomes comparatively worse due to air flow resistance.

In contrast, in vehicle front portion structure 10, a cooling air flow is taken in from duct 82 of under cover 84, so there is no need to form an opening for taking in air in front bumper cover 30. Further, since seal member 80 seals between opening end 14A of floor tunnel 14 and cooling unit 74, it is possible to expel air guided from duct 82 smoothly through floor tunnel 14 which has little air flow resistance. Moreover, due to a negative pressure at the rear of heat exchange portion 74A in a vehicle front-rear direction generated by flap 86, the passage of an air flow guided from duct 82 through heat exchange portion 74A, in other words, a heat exchange at heat exchange portion 74A, is promoted. As a result, in vehicle front portion structure 10, it is possible to suppress disruption of an air flow around vehicle A accompanying with the running of vehicle A, to promote heat exchange at cooling unit 74, and to simultaneously improve the aerodynamic performance (fuel efficiency) of vehicle A and the cooling performance of air conditioning unit 72.

In vehicle front portion structure 10, since seal member 80 seals between opening end 14A of floor tunnel 14 and cooling unit 74, heated air which is heated at power unit 50 is prevented from moving to within floor tunnel 14, and thereby a reduction in performance of cooling unit 74 due to the heated air can be prevented.

In vehicle A, which is a hybrid vehicle in which power unit 50 generates little heat as explained above, by arranging air conditioning unit 72 to the rear of power unit 50 in a vehicle front-rear direction, it is possible to warm the engine quickly at the initial stage of a cold start. This contributes to improved fuel efficiency at the initial stage of a cold start.

Effect of Arranging a Battery

In vehicle front portion structure 10, battery 76, which, as explained above, has a sufficient capacity while having a small size, is arranged at a center portion in a vehicle width direction in instrument panel space I. Thereby, battery 76, which is comparatively heavy, can be arranged closer to center of gravity G of vehicle A, and it is possible to reduce a yaw moment of inertia. As a result, it is possible to increase running stability of vehicle A. Moreover, in vehicle front portion structure 10, since window portion 42 is formed in dash panel 34, it is possible to make air conditioning unit 72, which is arranged in engine room E, and battery 76, which is arranged in instrument panel space I, modular.

By making air conditioning unit 72 and battery 76 modular, they can be attached to a vehicle body in an integrated manner. Accordingly, the attachability of air conditioning unit 72 and battery 76 to vehicle body 11 is improved. In particular, in vehicle front portion structure 10, since cooling unit 74 is also made modular, air conditioning unit 72, cooling unit 74, and battery 76 each has high attachability.

In vehicle front portion structure 10, owing to battery cooling duct 94 and battery cooling outlet 96, when a temperature of battery 76 is high, air-conditioned air of air conditioning unit 72 can be used to perform a forced cooling of battery 76. This prevents overheating of battery 76 and contributes to improved performance and endurance of battery 76.

Further, in vehicle front portion structure 10, since window portion 42 is formed in dash panel 34, battery 76 can be attached within instrument panel space I from an engine room E side. As a result, in vehicle front portion structure 10, it is possible to attach or remove battery 76 without taking off instrument panel 38 or the like, and therefore the attachability and maintenance properties of battery 76 are high.

Moreover, in vehicle front portion structure 10, since battery 76 is elastically supported with respect to partition panel 90 and battery mounting bracket 98 via rubber bushing 92, owing to a damping effect of rubber bushing 92, it is possible to suppress (block) transmission of a vibration to battery 76.

Figure 12:
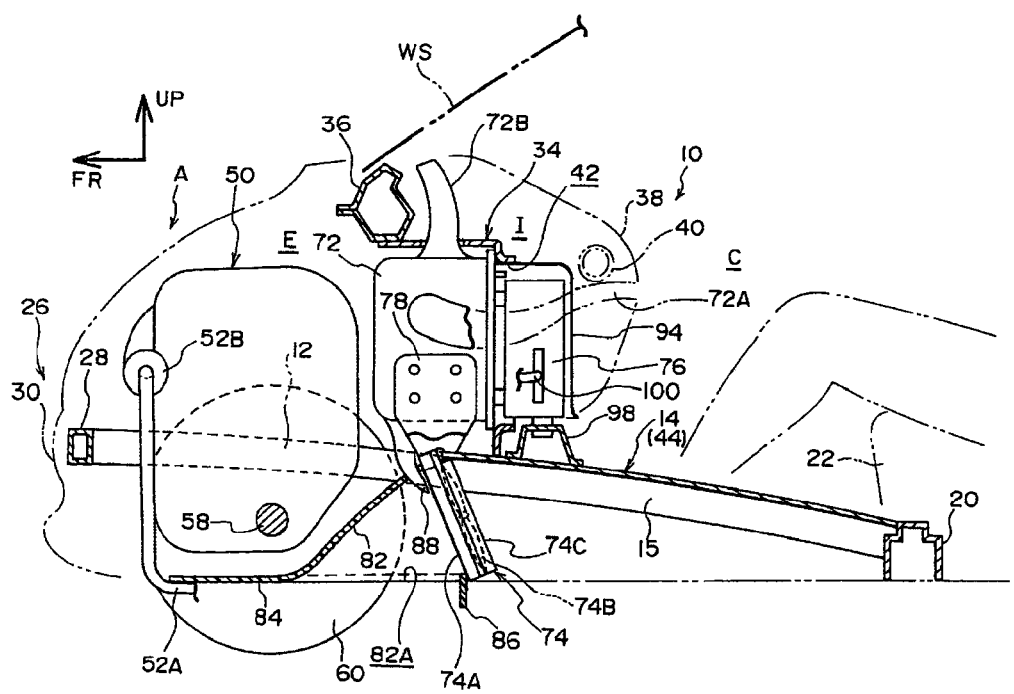
FIG. 12 is a sectional side view schematically showing a vehicle front portion structure according to a variation of an embodiment of the present invention.

In the above embodiment, explanation is given of an example in which exhaust pipe 52A of engine 52 exits from a rear side in a vehicle front-rear direction. However, the present invention is not limited to this, and may include a configuration, for example, in which exhaust pipe 52A exits from a front side in a vehicle front-rear direction of engine 52, as shown in FIG. 12. In this variation, catalytic converter 52B is disposed in front of engine 52, and has a length direction in a vehicle width direction, and exhaust pipe 52A of engine 52 is led under the floor and towards a rear in a vehicle front-rear direction (since this portion is a common configuration, it is omitted in the drawings). Owing to this embodiment, since exhaust pipe 52A and catalytic converter 52B are not provided within floor tunnel 14, an air flow that accompanies a cooling of air conditioning unit 72 can be made even smoother.

Figure 13:
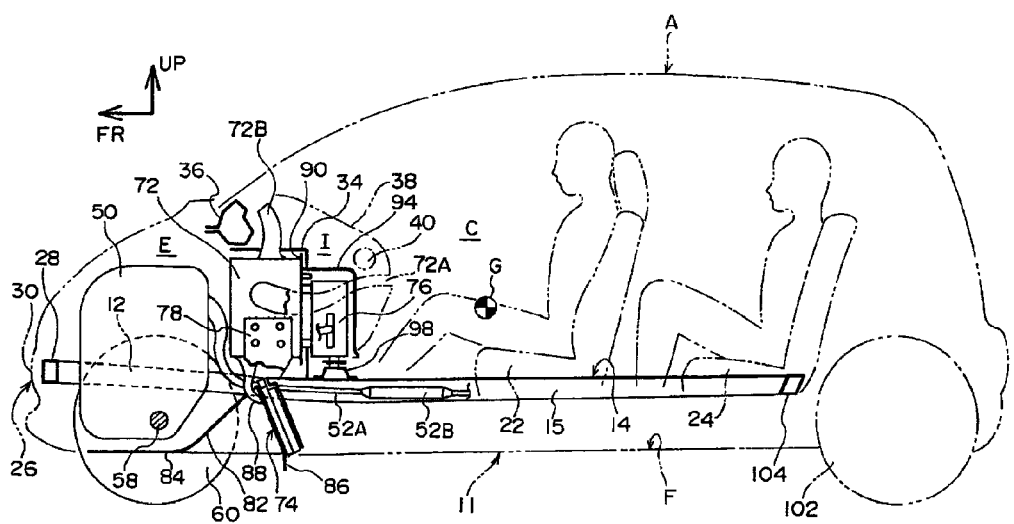
FIG. 13 is a sectional side view schematically showing a vehicle front portion structure according to another variation of an embodiment of the present invention.

In the above embodiment, an example is given in which floor tunnel 14 is provided up to cross member 20 for front seat 22. However, the present invention is not limited to this, and may include a configuration, for example, in which floor tunnel 14 passes through a center in a vehicle width direction of a rear seat, as shown in FIG. 13. In this variation, tunnel side members 15 extend up to a rear side in a vehicle front-rear direction, and tunnel side members 15 can therefore be provided closer to a center of gravity G of vehicle A in a vehicle vertical direction. As a result, a strength necessary to resist bending in a frontal impact can be further reduced, which contributes to increased lightening of vehicle body 11. In the example shown in FIG. 13, tunnel side members 15 contact a cross member 104 at a rear portion in a vehicle front-rear direction.

In the above embodiment, an example is given in which power unit 50 is provided with both engine 52, which is an internal combustion engine, and electric motor 54, as power sources. However, the present invention is not limited to this, and may include a configuration, for example, in which power unit 50 includes only one of engine 52 or electric motor 54 as a power source. In a configuration in which only engine 52 is provided as power unit 50, a configuration may be adopted, for example, in which an electric motor as a drive source is disposed at a rear portion in a vehicle front-rear direction, or disposed within a vehicle wheel.

Further, in the above embodiment, an example is given in which, cooled air obtained by air conditioning unit 72 is used as a cooling assisting structure and a battery cooling structure. However, the present invention is not limited to this, and may include a configuration, for example, in which water in a liquid phase obtained by a dehumidifying function of air conditioning unit 72 may be applied as drops or mist to cooling unit 74 or battery 76. In this configuration, it is possible to obtain a large cooling effect owing to the evaporation of moisture.

The present invention is not limited by the above-described embodiments, and may be implemented by modification thereof in various ways providing these do not exceed the gist of the invention.

What is claimed is:

1. A vehicle front portion structure comprising:
a framework member of a front bumper;
a power unit provided rearward in a vehicle front-rear direction with respect to the framework member, that drives at least a front wheel of a vehicle, and
a cooling unit provided rearward in a vehicle front-rear direction with respect to the power unit and at a vehicle front with respect to a dash panel, and comprising at least one of a heat exchanger that is part of a cooling system of the power unit or a condenser of an air conditioning device,
wherein the cooling unit is positioned at a vehicle front with respect to a floor tunnel that opens at a lower portion in a vehicle vertical direction of the dash panel,
the vehicle front portion structure further comprises a seal structure that seals a space between a peripheral edge portion not including a lower edge in a vehicle vertical direction of the cooling unit, and
an opening edge portion of the floor tunnel, and an opening end of the floor tunnel which faces a vehicle front direction is closed by the cooling unit via the seal structure,
wherein the vehicle front portion structure has a duct for introducing cooling air from an intake port that opens downward in a vehicle vertical direction to the cooling unit, and
wherein the duct is configured so as to push out a portion of an undercover, which covers an engine room of the vehicle from below and upwardly in the vehicle vertical direction.

2. The vehicle front portion structure of claim 1, further comprising an air conditioning unit for air conditioning a cabin, provided at a vehicle front with respect to the dash panel and being modular such that it can be handled in an integrated manner with the cooling unit.

3. The vehicle front portion structure of claim 2, wherein the air conditioning unit includes a cooling assisting structure for assisting a cooling function of the cooling unit.

4. The vehicle front portion structure of claim 1, further comprising: an air conditioning unit for air conditioning a cabin, provided at a vehicle front with respect to the dash panel; an electric motor that constitutes at least a part of the power unit, or an electric motor that is provided independently of the power unit and that generates a driving force for running a vehicle, and a battery which is modular such that it can be handled in an integrated manner with the air conditioning unit, and which stores electricity supplied to the electric motor.

5. The vehicle front portion structure of claim 4, wherein a module comprising the battery and the cooling unit is inserted from a vehicle front side through an opening portion provided at the dash panel, and is detachably supported with respect to the dash panel, and at least a portion of the battery is positioned at a rear in a vehicle front-rear direction with respect to the dash panel.

6. The vehicle front portion structure of claim 4, wherein the air conditioning unit comprises a battery cooling structure for cooling the battery.

7. The vehicle front portion structure of claim 1, further comprising a flow adjusting member provided below the cooling unit in a vehicle vertical direction, for generating negative pressure at a rear in a vehicle front-rear direction with respect to the cooling unit accompanying the running of a vehicle.

* * * * *